United States Patent Office 2,761,759
Patented Sept. 4, 1956

2,761,759

PROCESS FOR THE PREPARATION OF A NOVEL SODIUM PERBORATE TRIHYDRATE

Dirk Willem van Gelder, Maasniel, Netherlands, assignor to Koninklijke Industrieele Maatschappij voorheen Noury & Van der Lande N. V., Deventer, Netherlands, a corporation of the Netherlands No Drawing. Application October 12, 1953, Serial No. 385,721

Claims priority, application Netherlands October 17, 1952

8 Claims. (Cl. 23—60)

Various hydrates of sodium perborate (also called sodium metaborate perhydrate) are known, the most important of which are sodium perborate monohydrate, of the formula $NaBO_3.H_2O$ or $NaBO_2.H_2O_2$, and sodium perborate tetrahydrate, of the formula $NaBO_3.4H_2O$ or $NaBO_2.H_2O_2.3H_2O$. These compounds may both be obtained in a crystalline form. Other hydrates, which are described in the literature, are mixtures of the above-mentioned salts or possess an amorphous structure.

Various difficulties arise in the use of these compounds as such and even more when mixed with other substances. Sodium perborate monohydrate is very hygroscopic and, therefore, it is not stable as such; the amorphous products have the same disadvantage. The tetrahydrate has a relatively low active oxygen content which is theoretically 10.4% and in practice is about 10.0–10.2%. At increased temperature (40–60° C.), it will easily clot or even liquefy.

It is the object of the invention to provide a process for the preparation of a sodium perborate salt which is not subject to these disadvantages.

According to the invention, a process for the preparation of sodium perborate trihydrate comprises stirring or otherwise agitating a suspension of sodium perborate tetrahydrate in water at normal or somewhat enhanced temperature and recovering sodium perborate trihydrate crystals.

The invention offers a process for the preparation of a new crystalline sodium perborate hydrate, viz. sodium perborate trihydrate, of the formula $NaBO_3.3H_2O$ or $NaBO_2.H_2O_2.2H_2O$, which new perborate compound does not show the above-mentioned drawbacks and, moreover, may be prepared in a simple way from the usual commercial salt, sodium perborate tetrahydrate. This may be effected by stirring a suspension of tetrahydrate in water for some time at normal or at somewhat enhanced temperature or by agitating it in any other way, after which the trihydrate may be separated out.

The process may be furthered by inoculating the mass with a small quantity of crystals obtained from a previous operation of the process. During the process, care should be taken that perborate, which has gone into solution decomposes only slightly or not at all. Therefore, in some cases it will be necessary to add to the mass stabilizing agents such as magnesium silicate or stannic dioxide.

Example

A paste of equal parts by weight of commercial sodium perborate tetrahydrate and water was stirred for 4 hours at 50° C. Thereafter, the mass was filtered over a rotating filter to recover sodium perborate trihydrate crystals, and these crystals were then dried in a vacuum-drier at 40° C. A part of the original perborate content remained in the mother-liquor, but could be used again to make additional quantities of the desired trihydrate. Taking into consideration the latter, the over-all yield of active oxygen was 98%.

The sodium perborate trihydrate obtained is not hygroscopic. It has no tendency to clot or liquefy at temperatures of 40–60° C. The active oxygen content is 11.7%. The melting point is near 85° C., and more particularly, 81.7°±0.2° C. The solubility in water is 2.3 g. of $NaBO_3.3H_2O$ per 100 g. of solution at 25° C. and 5.7 g. of $NaBO_3.3H_2O$ per 100 g. of solution at 50° C.

What is claimed is:

1. A process for the preparation of sodium perborate trihydrate which comprises the steps of agitating a suspension consisting essentially of sodium perborate tetrahydrate in water, and recovering the crystals of sodium perborate trihydrate thereby produced.

2. A process for the preparation of sodium perborate trihydrate which comprises the steps of agitating a suspension consisting essentially of sodium perborate tetrahydrate in water at an elevated temperature, and recovering the crystals of sodium perborate trihydrate thereby produced.

3. A process for the preparation of sodium perborate trihydrate which comprises the steps of stirring a suspension of sodium perborate tetrahydrate in water at a temperature of about 50° C., and recovering the crystals of sodium perborate trihydrate thereby produced.

4. A process for the preparation of sodium perborate trihydrate which comprises the steps of agitating a suspension of sodium perborate tetrahydrate in water, inoculating said suspension with a small quantity of sodium perborate trihydrate crystals, and recovering sodium perborate trihydrate crystals from said suspension.

5. A process for the preparation of sodium perborate trihydrate which comprises the steps of agitating a suspension consisting essentially of sodium perborate tetrahydrate in water, recovering sodium perborate trihydrate crystals from said suspension by filtration, and drying said crystals in a vacuum drier.

6. A process for the preparation of sodium perborate trihydrate which comprises the steps of agitating a suspension consisting essentially of sodium perborate tetrahydrate in water, adding a stabilising agent to said suspension, and recovering sodium perborate trihydrate crystals therefrom.

7. A process for the preparation of sodium perborate trihydrate which comprises the steps of agitating a suspension consisting essentially of sodium perborate tetrahydrate in water, adding a stabilising agent selected from the group consisting of magnesium silicate and stannic dioxide to said suspension, and recovering sodium perborate trihydrate crystals.

8. As a new compound, crystalline non-hygroscopic sodium perborate trihydrate having the formula $$NaBO_3.3H_2O$$

References Cited in the file of this patent

UNITED STATES PATENTS

| 1,978,953 | McKeown | Oct. 30, 1934 |
| 2,380,779 | Nees | July 31, 1945 |
| 2,706,178 | Young | Apr. 12, 1955 |

FOREIGN PATENTS

| 548,432 | Germany | Apr. 12, 1932 |

OTHER REFERENCES

Taylor et al.: "I. and E. Chem.," vol. 27, No. 6, pages 672–680, June 1935.